United States Patent [19]

Vermilion et al.

[11] Patent Number: 5,075,685

[45] Date of Patent: * Dec. 24, 1991

[54] WARNING SYSTEM FOR TACTICAL AIRCRAFT

[75] Inventors: Everette E. Vermilion, Seattle; Noel S. Paterson, Redmond, both of Wash.

[73] Assignee: Sundstrand Data Control, Inc., Redmon, Wash.

[*] Notice: The portion of the term of this patent subsequent to Jan. 22, 2004 has been disclaimed.

[21] Appl. No.: 616,426

[22] Filed: Nov. 21, 1990

Related U.S. Application Data

[63] Continuation of Ser. No. 842,912, Mar. 24, 1986, Pat. No. 5,001,476, which is a continuation-in-part of Ser. No. 494,592, May 13, 1988, abandoned.

[51] Int. Cl.$^5$ ............................................. G08B 23/00
[52] U.S. Cl. .................................... 340/970; 340/963; 342/65; 364/433
[58] Field of Search .............. 340/970, 963; 73/178 T; 342/65; 364/433

[56] References Cited

U.S. PATENT DOCUMENTS

| | | | |
|---|---|---|---|
| 3,946,358 | 3/1976 | Bateman | 340/970 |
| 4,551,723 | 11/1985 | Paterson | 340/970 |
| 4,639,730 | 1/1987 | Paterson et al. | 340/970 |
| 4,980,684 | 12/1990 | Paterson et al. | 340/970 |
| 5,001,476 | 3/1991 | Vermilion et al. | 340/970 |

FOREIGN PATENT DOCUMENTS

| | | | |
|---|---|---|---|
| 2139589 | 11/1984 | United Kingdom | 340/970 |
| 8601622 | 3/1986 | World Int. Prop. O. | 340/970 |

*Primary Examiner*—Jin F. Ng
*Assistant Examiner*—Brent A. Swarthart
*Attorney, Agent, or Firm*—Mason, Kolehmainen, Rathburn & Wyss

[57] ABSTRACT

A system for warning the pilot of a tactical aircraft in a tactical maneuver such as a dive of the point at which recovery must be immediately initiated to prevent the aircraft from descending below a minimum desired altitude monitors and the altitude, descent rate and pitch angle of the aircraft, and issues a voice warning when recovery must be initiated. The system also provides warnings of dangerous flight conditions during non-tactical or common route segments of a flight such as the take-off, landing and cruise segments of a flight. Circuitry responsive to the arming of the weapons of the aircraft enables the tactical warning portion of the system and disables certain functions of the non-tactical portion of the sysem that may cause false warnings to be genrated during tactical manuevers.

6 Claims, 2 Drawing Sheets

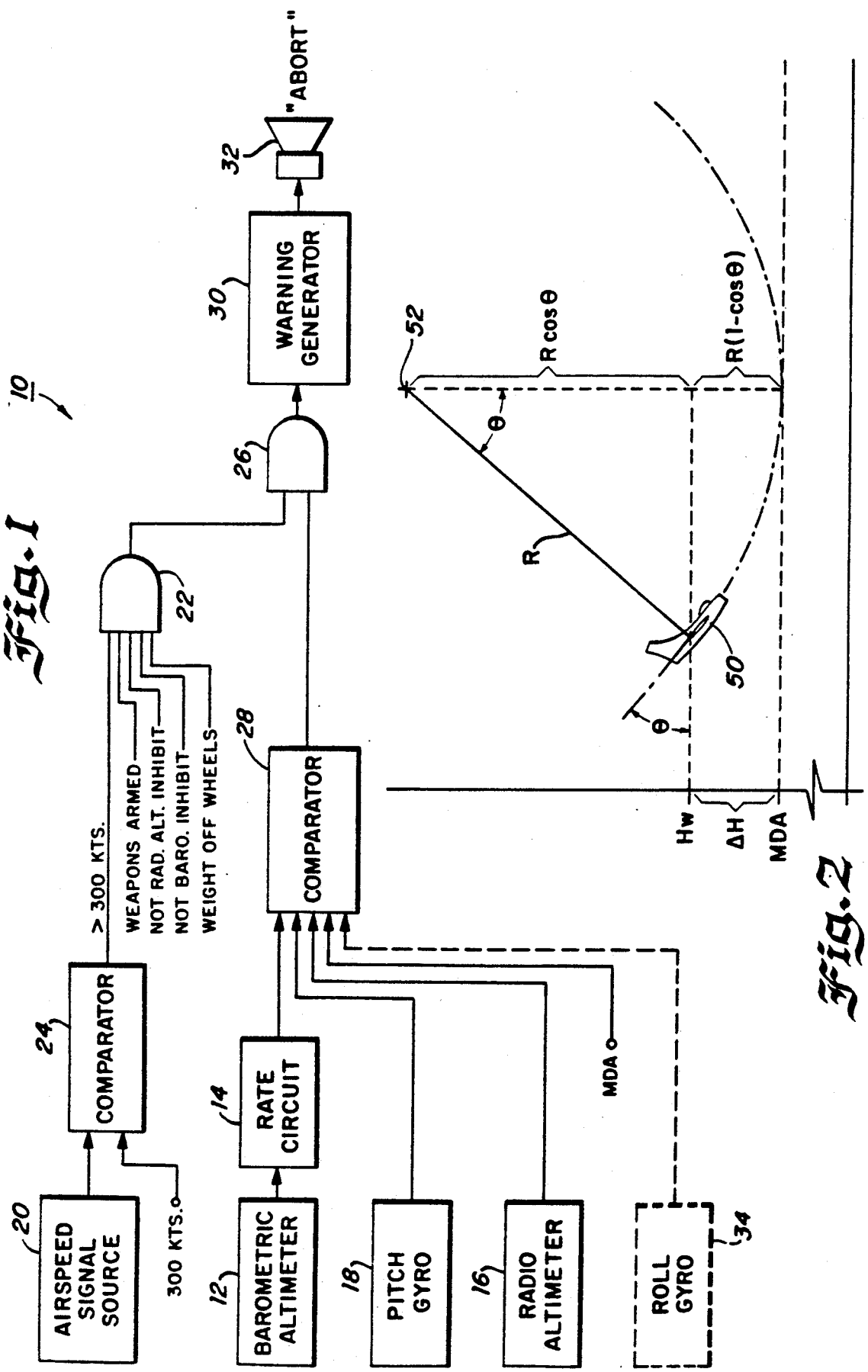

WARNING SYSTEM FOR TACTICAL AIRCRAFT

This is a continuation of application Ser. No. 06/842,912, filed on Mar. 24, 1986, now U.S. Pat. No. 5,001,476, which application is a continuation-in-part of application Ser. No. 06/494,592, filed on May 13, 1983, now abandoned.

BACKGROUND OF THE INVENTION

1. Field of the Invention

This invention relates generally to ground proximity warning systems, and more particularly to a system that provides a warning to the pilot of an aircraft in a tactical maneuver such as a dive that recovery must be initiated immediately to prevent the aircraft from going below a minimum desired altitude selected by the MDA, or radio altitude "bug", setting. The system also provides warnings of dangerous flight conditions during non-tactical or common route segments of a flight such as take-off, landing and cruise.

2. Description of the Prior Art

Ground proximity warning systems that provide warnings of various dangerous flight profiles are known. However, such systems are generally designed for transport aircraft, and are designed to provide warnings primarily in the take-off and landing phases of a flight to prevent inadvertent controlled flight into terrain. Such systems are not designed to provide warnings during tactical maneuvers such as dives wherein the aircraft is deliberately flown toward the ground at high speed and at a steep angle, and consequently would provide inadequate or false warnings under such conditions.

SUMMARY OF THE INVENTION

Accordingly, it is an object of the present invention to provide a warning system that overcomes many of the disadvantages of the prior art warning systems.

It is another object of the present invention to provide a warning of a dangerous flight condition during tactical maneuvers as well as during common route segments such as take-off, landing and cruise.

It is another object of the present invention to provide a warning to the pilot of an aircraft in a dive that recovery must be initiated immediately in order to prevent the aircraft from going below a minimum desired altitude.

Tactical aircraft present special problems in the design of ground proximity warning systems that warn the pilot of the aircraft of a dangerous flight condition. One such problem occurs because of the dual mode of operation of such aircraft. Typically, such aircraft have a tactical or weapons delivery mode which includes maneuvers such as dives and various low level maneuvering, as well as a non-tactical or common route segments mode of operation that includes maneuvers such as take-off, landing and cruise. Because maneuvers encountered in the tactical mode of operation of an aircraft are substantially different than the maneuvers typically encountered in the non-tactical mode, a system designed for non-tactical or transport aircraft will not provide adequate warnings during some tactical maneuvers, while providing false warnings during others. Similarly, a system designed specifically to provide warnings during tactical maneuvers, will not provide adequate warnings during the less severe, non-tactical maneuvers of a flight.

Therefore, in accordance with a preferred embodiment of the invention, there is provided a system that provides warnings of dangerous flight conditions in tactical as well as non-tactical phases of flight. The system according to the invention monitors the pitch angle, roll angle and barometric descent rate of the aircraft in the tactical mode of operation, and calculates the altitude at which recovery must be initiated to prevent the aircraft from going below a minimum desired altitude selected by the MDA, or radio altitude "bug" setting. When the minimum recovery altitude is reached, the warning system issues a specific aural warning that is distinct from non-tactical warnings, such as, for example, "ABORT", to indicate that recovery must be initiated immediately. The tactical warnings are enabled only during tactical phases of flight, and certain non-tactical warnings are disabled during the tactical phases.

DESCRIPTION OF THE DRAWING

These and other objects and advantages of the present invention will become readily apparent upon consideration of the following detailed description and attached drawing, wherein:

FIG. 1 is a logical functional block diagram of the warning system according to the invention;

FIG. 2 shows an aircraft in a dive, and illustrates the dynamics of dive recovery;

DETAILED DESCRIPTION OF THE PREFERRED EMBODIMENT

Figure 4:
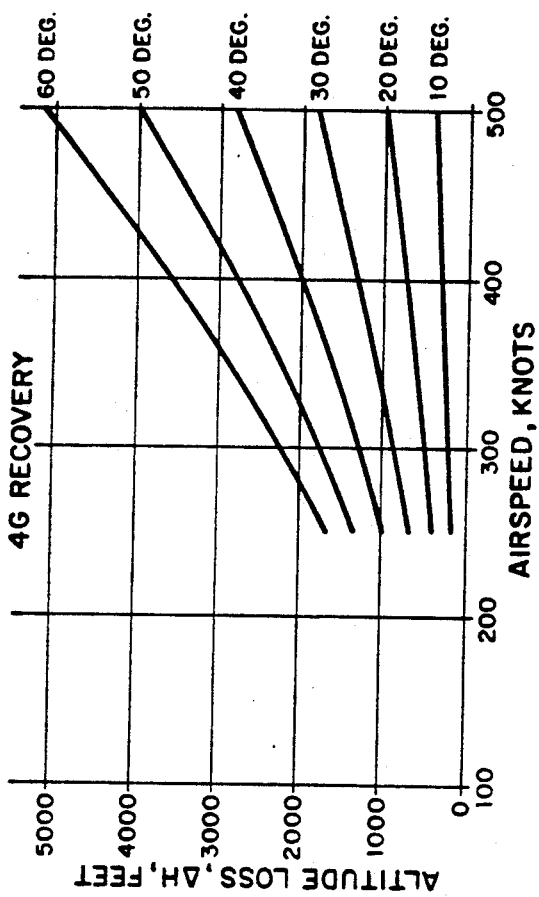
FIG. 4 is a graph showing the altitude loss of an aircraft during a 4G recovery from a dive as a function of airspeed and pitch angle.

Referring now to the drawing, with particular attention to FIG. 1, there is illustrated an embodiment of the tactical warning portion of the ground proximity warning system according to the invention generally designated by the reference numeral 10. The system 10 according to the invention is illustrated in FIG. 1 in logical block diagram form as a series of gates, comparators and the like for purposes of illustration; however, it should be understood that the actual implementation of the logic can be other than as shown in FIG. 1, with various digital and analog implementations being possible. The signals used by the system as described include radio altitude, barometric altitude rate, airspeed, pitch angle and roll angle of the aircraft, as well as signals indicating whether the weapons are armed, along with various validity signals. Depending on the type of aircraft in which the warning system is installed, the signals shown in FIG. 1 can be obtained from individual instruments such as a barometric altimeter 12, a barometric altitude rate circuit 14, a radio altimeter 16, a pitch gyroscope 18, a roll gyro 34, an airspeed signal source 20 such as an air data computer or airspeed indicator and various discrete circuit elements indicating whether the weapons are armed and whether there is weight on the wheels. Alternatively, these signals may be obtained from a digital data bus in certain newer aircraft.

The tactical warning portion of the system according to the invention is designed to be operative only during a tactical phase of flight, such as a bombing run or ground attack where a steep dive condition is encountered. Accordingly, the system is enabled only when conditions indicative of such a phase of operation are present. In the present embodiment, these conditions are that the weight of the aircraft is off the wheels, that the airspeed is greater than a predetermined airspeed, such as, for example, 300 knots, and that the weapons are armed.

The enabling function is provided by an AND gate 22 that receives signals indicating that the weapons are armed and that the weight is off the wheels, as well as a signal from a comparator 24 coupled to the airspeed signal source 20. The comparator 24 compares the signal from the airspeed signal source 20 with a reference signal representative of a predetermined airspeed, for example, 300 knots, and indicates when the airspeed of the aircraft exceeds a predetermined airspeed, e.g., 300 knots. In addition, the AND gate 22 receives signals indicating that the radio altimeter is not inhibited and that the barometric altimeter is not inhibited in order to inhibit the system in the event of a faulty instrument.

When all of the above conditions are met, the gate 22 enables another AND gate 26 to place the gate 26 under the control of a comparator 28 which receives a signal representative of the pitch angle of the aircraft from the pitch gyroscope 18, a signal representative of the barometric descent rate of the aircraft from the rate circuit 14, as well as a signal representative of the minimum descent altitude set by the MDA setting. (The function of the roll gyro 34, shown in dotted lines, is used in conjunction with an alternative embodiment discussed in detail below.) Based on these input signals, the comparator 28 determines the minimum recovery altitude, or a warning altitude, $H_w$, at which recovery must be initiated to prevent the aircraft going below the minimum descent altitude. The comparator also receives a signal representative of the altitude above ground of the aircraft from the radio altimeter 16, and provides a signal to the gate 26 in the event that the signal received from the radio altimeter 16 is representative of an altitude below the minimum recovery altitude. Once such a signal is received, the gate 26 initiates the operation of the warning generator, preferably a digital voice warning generator, thereby causing the generator 30 to generate a voice warning. The voice warning should be a specific warning, such as, for example, "ABORT" to indicate to the pilot exactly what action must be taken to avoid a dangerous flight condition. The voice warning is applied, either directly or indirectly, to a transducer 32, such as, a loudspeaker or an earphone, to be communicated to the pilot.

In addition to the speed and pitch of the aircraft, there are other factors that determine the altitude at which the dive recovery warning must be generated. These factors are related to the performance of the aircraft and include the reaction time of the aircraft and pilot, and the number of G's the aircraft can sustain during a pull up. In a standard recovery maneuver, the path of travel of the aircraft approximates an arc of a circle at the bottom of the pull-up maneuver. The radius of the circuit is determined by the number of G's that the aircraft can generate during the pull-up maneuver, with the radius of curvature of the arc being inversely proportional to the number of G's generated.

Referring to FIG. 2, there is shown an aircraft 50 that has just passed through the minimum recovery warning altitude, $H_w$, and is beginning its recovery. Assuming that the recovery is satisfactory, the aircraft will level off at the minimum descent altitude, MDA, and begin its climb as shown by the dashed line. The recovery path will be a circle to a first approximation, and the radius of the circle, R, will be determined by the number of G's that the aircraft can generate during its recovery.

For an object traveling in a circle, the normal acceleration, i.e., the radial, inwardly directed acceleration, is directly proportional to the square of the velocity of the object and inversely proportional to the radius of the circular path the object is traveling. Stated mathematically, this relationship becomes:

$$a_n = \frac{V^2}{R} \qquad (1)$$

where $a_n$ is the inwardly directed normal acceleration experienced by the object during the turn, V is the velocity of the object and R is the radius of curvature of the path of travel of the object.

If the descent angle of the aircraft 50, as represented by the dive angle or approximated by the pitch angle, is equal to $\theta$, the descent rate of the aircraft can be readily related to the velocity of the aircraft using simple trigonometric functions, specifically:

$$V = \frac{H_b}{\sin \theta} \qquad (2)$$

wherein $H_b$ is the descent rate of the aircraft, more specifically the barometric descent rate. In the illustrated embodiment of the invention, the barometric descent rate is used in the calculation; however, closure rate or radio altitude rate can be used in certain embodiments.

If the dive angle of the aircraft is $\theta$, then by geometric principles, the angle between a radius that is perpendicular to the path of travel of the aircraft and the vertical is also $\theta$ (FIG. 2). Consequently, the distance between the center 52 of the circle and the warning height, $H_w$, is equal to R cos $\theta$, and the distance between the warning height $H_w$ and the minimum descent altitude, MDA, is equal to R(1−cos$\theta$). The latter relationship permits the amount of altitude loss, $\Delta H$, between the warning height, $H_w$, and the minimum desent altitude, MDA, to be calculated as a function of the dive angle of the aircraft and the radius, R, of the circular path the aircraft is traveling.

Since the radius of the recovery path is a function of the velocity of the aircraft and the number of G's it can generate during a pull up, the altitude loss between the warning altitude and the MDA can be calculated in terms of the velocity of the aircraft and the number of G's being generated during pull up. Moreover, because the descent rate of the aircraft is a function of the velocity of the aircraft and the dive angle, the altitude loss, $\Delta H$, during recovery can be calculated as a function of descent rate and the number of G's generated in the pull up.

This is accomplished as follows: Taking relationship (2), squaring it and making appropriate trigronometric substitutions, the following relationship results:

$$V^2 = \frac{H_b^2}{\sin^2 \theta} = \frac{H_b^2}{(1 - \cos^2 \theta)} = \frac{H_b^2}{(1 + \cos \theta)(1 - \cos \theta)} \quad (3)$$

Rearranging relationship (1) and substituting relationship (3) therein we obtain:

$$R = \frac{V^2}{a_n} = \frac{H_b^2}{a_n(1 + \cos \theta)(1 - \cos \theta)} \quad (4)$$

Multiplying the relationship (4) by $(1 - \cos \theta)$, the altitude loss during the pull up, $\Delta H$, is obtained as follows:

$$\Delta H = \frac{H_b^2}{a_n(1 + \cos \theta)} \quad (5)$$

The last-mentioned relationship defines the altitude loss of the aircraft between the time that recovery from the dive is initiated and the aircraft attains level flight; however, it does not take into account the reaction time of the pilot and aircraft, nor is the minimum desired altitude considered. These factors must also be entered into the equation defining the warning height, $H_w$, to assure that the warning is given soon enough to permit the pilot to recover safely. The minimum descent altitude can readily be taken into account by adding the MDA setting to the altitude loss. Reaction time can be taken into account by adding a term equal to the reaction time of the pilot and aircraft, for example, 2 seconds, multiplied by the descent rate to the equation. Thus, the warning height $H_w$ is given by the following equation:

$$H_w = \frac{H_b^2}{a_n(1 + \cos \theta)} + 2H_b + MDA \quad (6)$$

wherein the factor multiplying the $H_b$ term represents the 2 second reaction time of the pilot and the aircraft; however other reaction times could be used.

The above equation can be used to define a warning altitude, $H_w$, for various types of aircraft having various performance characteristics. However, a 4G pull up is one that is typically used during tactical maneuvers because it does not subject the pilot to excessive stress. Thus, by using 4G's as the normal acceleration, $a_n$, and solving the above equation for a 4G recovery and a 2 second reaction time using numerical techniques, the following result is obtained:

$H_w = (H_b)^2$
$*(0.005176 + 0.0000236)*(\theta_p - 11) + 0.0000321*(\theta_p - 40) + 2H_b + MDA$ wherein:
$H_w$ is the radio altitude warning height in feet
$H_b$ is the barometric altitude rate in feet per second
$\theta_p$ is the pitch angle in degrees, and
MDA is the minimum desired altitude in feet.

In the above equation the terms $(\theta_p - 11)$ and $(\theta_p - 40)$ are not permitted to go negative. Thus, if the pitch angle is less than 11 degrees or less than 40 degrees, respectively, the $(\theta_p - 11)$ and $(\theta_p - 40)$ terms are set to zero. Also, the pitch angle of the aircraft is used instead of the dive angle to represent the descent angle because the pitch angle is readily obtained from a gyroscope or the like, and the dive angle is not; however, the actual dive angle can be used in the calculation. The dive angle differs from the pitch angle by the angle of attack of the wings, which is, typically only a few degrees. Thus, using the pitch angle instead of the dive angle in the calculation provides a satisfactory approximation of the warning height. Also, the numerical approximation of the trigonometric equation defining the warning height is used because it permits the warning system according to the invention to make simple multiplications rather than much more complex trigonometric calculations, thereby providing a faster response time.

Figure 3:
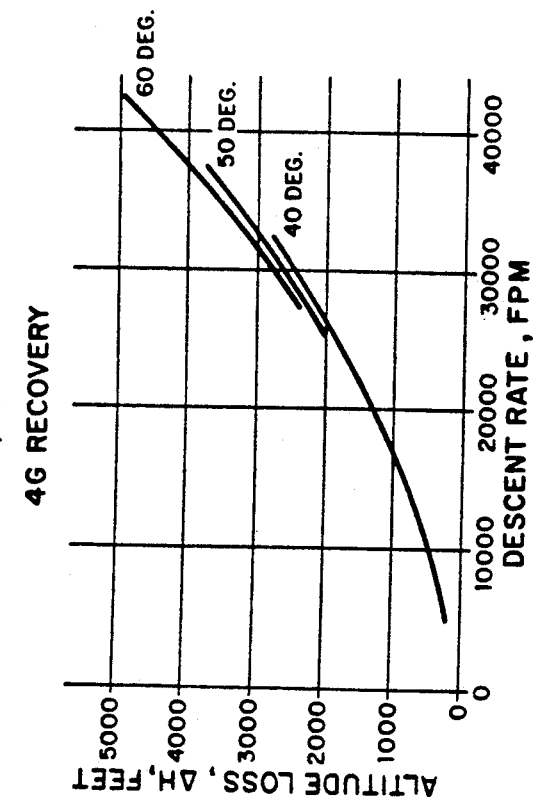
FIG. 3 is a graph showing the altitude loss of an aircraft during a 4G recovery from a dive as a function of descent rate and pitch angle.

The recovery envelope of the dive recovery mode of the warning system according to the invention for a 4G recovery is illustrated in FIG. 3. FIG. 3 shows the altitude loss, $\Delta H$, as a function of descent rate for various pitch angles. As can be seen from FIG. 3, the altitude loss, $\Delta H$, and consequently, the warning height, $H_w$, increases as the closure rate increases and as the pitch angle increases. However, because the cosine function changes slowly for small angles, the curve of FIG. 3 is relatively independent of pitch angle at lower pitch angles, i.e., dive angles below 40 degrees. Thus, the same curve can be used to define the warning boundary for pitch angles of approximately 40 degrees and below.

Also, as previously stated, descent rate and airspeed are related by the sine of the dive angle. Consequently, the warning envelope can also be defined in terms of airspeed rather than descent rate as is illustrated in FIG. 4, which shows the altitude loss, $\Delta H$, as a function of airspeed and pitch angle. Thus, in an alternative embodiment of the present invention, a signal representative of airspeed, rather than the descent rate, can be applied to the comparator 28 and the curves of FIG. 4, rather than those of FIG. 3, can be used to determine the altitude loss and the warning height.

As heretofore stated, equation (5) defines the altitude loss of the aircraft between the time that recovery from the dive is initiated and the time aircraft attains level flight, or more precisely, $\Delta H$ as shown in FIG. 2. However, in order to determine the height at which the warning is to be given, altitude loss prior to initiation must be taken into consideration. Accordingly, the pilot reaction time must be taken into account. This was heretofore assumed to be 2 seconds. In addition, it is possible, particularly during tactical phases of operation, that the aircraft will be in a roll prior to the dive. If the aircraft is in a roll prior to dive recovery, it is necessary to also take into account the amount of time that it takes an aircraft to level off from a roll. This time is equal to the roll angle divided by the maximum roll rate. Expressed mathematically, $$t_\phi = \phi/\dot{\phi} \quad (7)$$

wherein:
$t_\phi$ = time for the aircraft to level off after a roll;
$\phi$ = roll angle of the aircraft; and
$\dot{\phi}$ = maximum roll rate for an aircraft.

This roll time $t_\phi$ multiplied by the altitude loss associated therewith, $H_b$, will result in the required altitude loss associated with roll correction. Thus equation (6) becomes;

$$H_w = \frac{H_b^2}{a_n(1 + \cos \theta)} + 2H_b + t_\phi H_b + MDA \quad (8)$$

As in the case of equation (6), a 2 second pilot reaction time is assumed. In order to account for the roll correction the circuitry, FIG. 1 must be modified slightly. A function block 34, captioned roll gyro, shown in dotted lines, has been added. This block provides a signal representative of the aircraft roll angle to the comparator 28.

Since the maximum roll angle rate $\dot\phi$ can be approximated as a constant for a particular aircraft, the reference signal (not shown) to which the roll angle $\phi$ signal is compared can be adjusted accordingly to provide directly a signal representative of roll time $t_\phi$. For example, certain aircraft have a maximum roll rate characteristic of 50 degrees per second. Thus, if an aircraft has a 45 degree roll angle prior to recovery, an altitude loss corresponding to 0.9 seconds is added to the warning height, $H_w$.

In the preferred embodiment where the warning height $H_w$ is corrected for roll angle $\phi$, it has been determined that the height added to the warning height to allow an aircraft to return to a wings level attitude can produce some nuisance warnings. It has further been determined that such nuisance warnings can be reduced by correcting only for roll angles in excess of 45 degrees. The roll time correction equation (7) in the above-discussed embodiment then becomes:

$$t_{100} = (\phi - 45°)/\dot\phi \qquad (9)$$

The term $t_\phi$ is not allowed to go negative, and below 45 degrees of roll, the term is set to zero and no roll correction is made. The modified value for $t_\phi$ is then used in equation (8). As in the case of equation (6), equation (8) may also be solved using numerical techniques. In this case the time $t_\phi$ would simply be added to the previously discussed numerical solution to equation (6). With the modified roll angle correction, a pilot can operate more aggressively without a warning with still enough time for dive recovery since the aircraft can start pulling up at a 45 degree roll angle while rolling to a wings level attitude.

Figure 5:
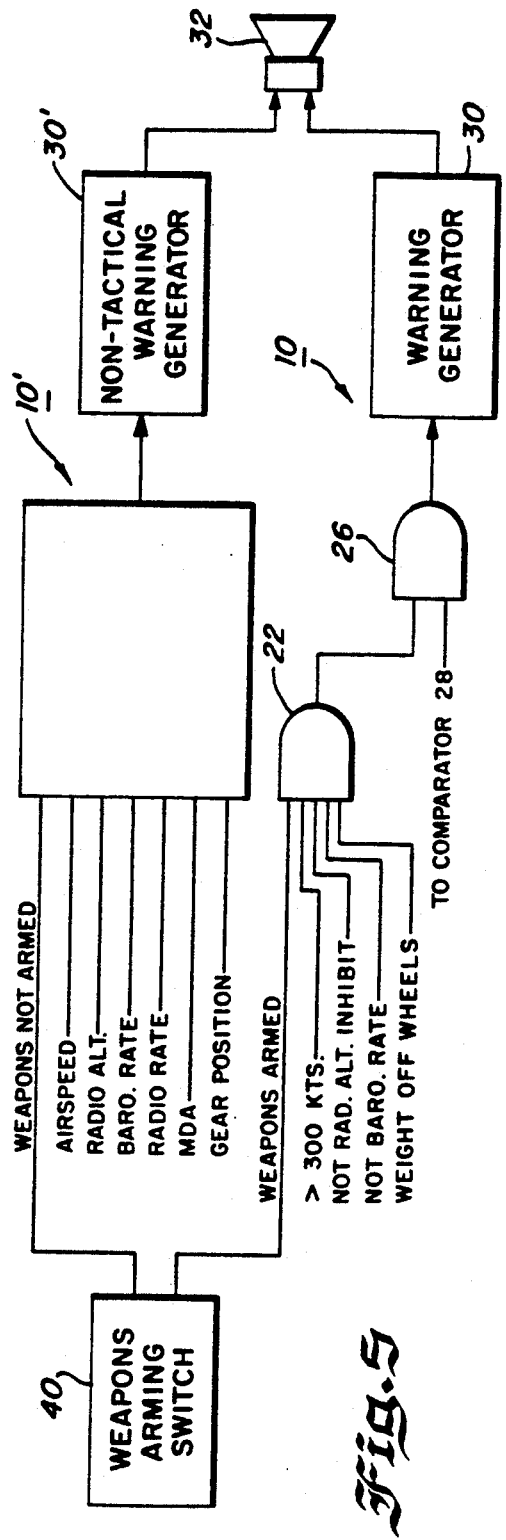
FIG. 5 is a block diagram of a grounded proximity warning system according to the invention usable for both tactical and non-tactical maneuvers.

Referring to FIG. 5, there is shown a portion of the dive recovery warning system utilized in conjunction with systems that generate warnings of a dangerous flight condition under various non-tactical flight conditions. In the block diagram of FIG. 5, like numbers are used to indicate the same components illustrated in FIG. 1, and primed numbers are used to designate components of the non-tactical portion of the warning system that are analogous to components of the tactical portion of the system that are designated by a like unprimed number. Thus, the non-tactical portion of the warning system 10' is analogous to the tactical portion of the warning system 10, and the non-tactical warning generator 30' is analogous to the tactical warning generator 30.

The system 10', illustrated in FIG. 5, also utilizes various signals representative of various flight parameters of the aircraft including airspeed, radio altitude, barometric altitude rate, radio altitude rate, a signal representative of the minimum descent altitude, MDA, a signal representative of the arming of the weapons, a signal representative of the position of the landing gear, as well as various validity signals (not shown). As in the case of the system 10, the system 10' receives the signals either from various individual instruments and discrete circuit elements, or from a digital data bus. The system 10' analyzes the received signals and provides a warning function in the event that a dangerous flight condition exists. Typical functions performed by the system 10' include the functions described in copending applications filed by the same inventors as the inventors of the present invention entitled "NEGATIVE CLIMB AFTER TAKE-OFF WARNING SYSTEM" Ser. No. 494,589, now U.S. Pat. No. 4,951,047, "SYSTEM FOR ALERTING A PILOT OF A DANGEROUS FLIGHT PROFILE DURING LOW LEVEL MANEUVERING" Ser. No. 494,590, now abandoned, "EXCESSIVE TERRAIN CLOSURE WARNING SYSTEM" Ser. No. 494,591, now U.S. Pat. No. 4,639,730, "EXCESSIVE DESCENT RATE WARNING SYSTEM FOR TACTICAL AIRCRAFT" Ser. No. 494,594, now U.S. Pat. No. 4,916,447. All of the above applications were filed on May 13, 1983 and are assigned to the same assignee as the assignee of the present invention and incorporated herein by reference.

The system 10' may contain one or more of the warning functions disclosed in the above-identified applications, or other warning functions, and is operative during the non-tactical phases of aircraft operation. The system 10' controls the operation of a non-tactical warning generator 30', and causes the generator 30' to generate various voice warnings that are applied to the transducer 32, or other suitable transducer, to inform the pilot of a dangerous flight condition during non-tactical phases of flight operation. Typical of such warnings are "DON'T SINK", which indicates to a pilot that he is sinking after take-off, "TOO LOW", which indicates to a pilot that he is flying below the minimum descent altitude, "TERRAIN", which warns a pilot of excessive terrain closure during low altitude flight, "SINK RATE", which indicates to a pilot that he is sinking too rapidly on approach to a landing, and "TOO LOW GEAR", which warns a pilot if he should attempt to land with the landing gear up.

While all of the warnings are useful during the non-tactical phases of flight, some of these warnings can be triggered falsely during tactical phases of flight, thereby causing nuisance warnings. In particular, the "TERRAIN" warning and the "SINK RATE" warning are likely to be generated during tactical maneuvers because both the radio altitude rate and the barometric altitude rate are high during tactical maneuvers. Consequently, those non-tactical modes most likely to be falsely triggered can be inhibited during tactical maneuvers.

Consequently, the system 10' is provided with a weapons not armed input that inhibits the generation of any warnings, such as, for example, the "TERRAIN" and "DON'T SINK" warnings, and other warnings which would cause nuisance warnings to be generated during tactical maneuvers. Such a signal can be conveniently obtained from a weapons arming switch 40 which is used to arm the weapons of the aircraft. Such a switch can be used to provide a WEAPONS NOT ARMED signal to the system 10' to inhibit any warnings that would be a nuisance during tactical flight, as well as to enable the tactical warning system 10 during the tactical phases of flight.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A ground proximity warning system usable for generating warnings indicating dangerous aircraft flight conditions in tactical and on-tactical phases of aircraft operation, comprising:

first means responsive to flight conditions of the aircraft during non-tactical phases of flight for generating a warning indicative of a dangerous flight condition;

second means responsive to flight conditions of the aircraft during tactical phases of flight for generating a warning indicative of a dangerous flight condition; and inhibiting means for inhibiting the generation of a warning by the non-tactical phase of flight responsive means when the aircraft is in a tactical phase of flight.

2. A ground proximity warning system as recited in claim 1 wherein said inhibiting means includes means responsive to a weapons arming signal.

3. A ground proximity warning system as recited in claim 1 wherein said first warning generating means is responsive to the altitude of the aircraft above the ground for generating a warning if the altitude above ground decreases at an excessive rate.

4. A ground proximity warning system as recited in claim 3 wherein said inhibiting means includes means for preventing the generation of the warning that the altitude above ground is decreasing excessively rapidly.

5. A ground proximity warning system as recited in claim 1 wherein said first warning generating means is responsive to the descent rate of the aircraft for generating a warning if the aircraft is descending at an excessive rate.

6. A ground proximity warning system as recited in claim 5 wherein said aircraft has tactical weapons and means for generating a weapons arming signal when the weapons are armed, and wherein said inhibiting means includes means for preventing the generation of the warning that the aircraft is descending excessively rapidly responsive to said weapons arming signal.

* * * * *